United States Patent
Dacre-Wright et al.

(10) Patent No.: US 10,699,582 B2
(45) Date of Patent: Jun. 30, 2020

(54) MANAGEMENT OF ALTERNATIVE ROUTES FOR AN AIRCRAFT

(71) Applicant: THALES, Courbevoie (FR)

(72) Inventors: Benoît Dacre-Wright, Toulouse (FR); Olivier Pineau, Toulouse (FR); François Nefflier, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/009,017

(22) Filed: Jun. 14, 2018

(65) Prior Publication Data
US 2018/0366008 A1 Dec. 20, 2018

(30) Foreign Application Priority Data
Jun. 16, 2017 (FR) ..................... 17 00649

(51) Int. Cl.
G08G 5/00 (2006.01)
G02B 27/01 (2006.01)
G01C 21/20 (2006.01)
G01C 23/00 (2006.01)

(52) U.S. Cl.
CPC .......... G08G 5/0021 (2013.01); G01C 21/20 (2013.01); G01C 23/00 (2013.01); G02B 27/0101 (2013.01); G08G 5/0034 (2013.01); G08G 5/0039 (2013.01); *G02B 2027/014* (2013.01); *G02B 2027/0141* (2013.01)

(58) Field of Classification Search
CPC .. G08G 5/0021; G08G 5/0034; G08G 5/0039; G01C 21/20; G01C 23/00; G02B 27/0101; G02B 2027/014; G02B 2027/0141
See application file for complete search history.

(56) References Cited

U.S. PATENT DOCUMENTS

| | | | |
|---|---|---|---|
| 6,097,996 A | 8/2000 | Deker | |
| 2003/0042790 A1* | 3/2003 | Amberkar | B60T 8/172 303/140 |
| 2004/0133833 A1* | 7/2004 | Nozuyama | G01R 31/318342 714/738 |
| 2008/0195309 A1 | 8/2008 | Prinze, III et al. | |
| 2013/0075532 A1* | 3/2013 | Fuscone | B64D 37/00 244/135 A |

(Continued)

FOREIGN PATENT DOCUMENTS

| | | |
|---|---|---|
| FR | 2749686 A1 | 12/1997 |
| FR | 3020882 A1 | 11/2015 |
| FR | 3029619 A1 | 6/2016 |

*Primary Examiner* — Behrang Badii
*Assistant Examiner* — Daniel L Greene
(74) *Attorney, Agent, or Firm* — Baker & Hostetler LLP

(57) ABSTRACT

Various methods for regulating and/or for integrating avionic systems with non-avionic systems are described. An avionic system is generally associated with a physical fault rate that is lower and a logic verification that is higher than those of a non-avionic system. Developments describe notably the use: of remote computing resources; of comparison, test, verification and authorization steps before injection of data of non-avionic origin into the avionics; of human-machine interaction methods; of various parameters (weather, air traffic, etc.) for the purpose of combinatorial optimization; and of electronic flight bags EFB and of flight management systems FMS.

15 Claims, 4 Drawing Sheets

(56) References Cited

U.S. PATENT DOCUMENTS

| | | | |
|---|---|---|---|
| 2015/0241295 A1* | 8/2015 | Fuscone | G01M 1/125 |
| | | | 701/124 |
| 2015/0323933 A1 | 11/2015 | Darbois et al. | |
| 2016/0163202 A1 | 6/2016 | Marion et al. | |
| 2016/0229554 A1* | 8/2016 | Kawalkar | G01C 23/005 |

* cited by examiner

MANAGEMENT OF ALTERNATIVE ROUTES FOR AN AIRCRAFT

CROSS-REFERENCE TO RELATED APPLICATIONS

This application claims priority to foreign French patent application No. FR 1700649, filed on Jun. 16, 2017, the disclosure of which is incorporated by reference in its entirety.

FIELD OF THE INVENTION

The invention relates to the field of avionics. The invention relates in particular to methods and to systems for managing alternative routes for an aircraft.

BACKGROUND

In existing avionic systems, alternative 'airways' (flight plans) are able to be inserted into the flight plan of a flight manager forming part of the (certified) avionics of the aircraft. This insertion may be performed manually, for example by inserting an air-ground data link message originating from air traffic control (or from the airline). The flight plan is then loaded into what is termed a secondary flight plan so as to allow the pilot to verify it, possibly to adjust it, and then to insert it as the new flight reference.

These flight management techniques encounter limitations that are inherent to the avionic systems. For example, the methods for modifying the route of the aircraft are limited by the capabilities afforded by the avionic equipment (e.g. editing functions), and also by the limitations in terms of computing power, of storage and of bandwidth, and even of human-machine interaction (e.g. screens that are not touchscreens).

On account of this, in operational terms, the management of the mission of the aircraft is based on factual elements that are restricted and limited, by design, due to the limitations inherent to the avionic systems.

With regard to the management of avoidance routes (for example for avoiding an unfavourable weather event), various methods for computing a (lateral or vertical) avoidance route are known. For example, patent document FR2749686, entitled 'Procédé de pilotage d'un aérodyne pour l'évitement vertical d'une zone' ('Method for piloting an aerodyne for the vertical avoidance of an area') discloses a system for lateral avoidance on the basis of information that is supplied periodically. This type of approach exhibits limitations, however. Specifically, existing methods are generally based on relatively simple processing operations that are intended to be integrated into the avionics. As an alternative, complex computations may be performed, but the result of these computations is not able to be inserted directly or easily into the avionics (loading into the avionics requires either an entry by the pilot, or at the least verification by the pilot, for which the viewing means embedded in the avionics are unsuitable). The technical problem of integrating avionic systems with non-avionic systems remains.

There is a need for advanced methods and systems for managing alternative routes for an aircraft.

SUMMARY OF THE INVENTION

Various methods for regulating and/or for integrating avionic systems with non-avionic systems are described. An avionic system is generally associated with a physical fault rate that is lower and a logic verification that is higher than those of a non-avionic system. Developments of the invention describe notably the use: of remote computing resources; of comparison, test, verification and authorization steps before injection of data of non-avionic origin into the avionics; of human-machine interaction methods; of various parameters (weather, air traffic, etc.) for the purpose of combinatorial optimization; and of electronic flight bags EFB and of flight management systems FMS.

The proposed solution consists in providing capabilities for loading data, graphic and manual editing, and for computing the route of the aeroplane on computing means external to the avionics (tablet, laptop, remote server), and also means for exchanging and for verification with the active route in the avionics, allowing the evaluation and then the secure insertion of the alternative route into the avionics.

Advantageously, the invention allows one or more alternative routes to be determined by utilizing enriched data (for example context data), computing capabilities and human-machine interaction methods having qualities and performance that avionic systems on their own do not allow.

Advantageously, the invention makes it possible to exploit the generally superior capabilities of non-avionic systems in terms of information processing (e.g. laptops, tablets and cloud computing remote resources).

Advantageously, the invention makes it possible to exploit numerous and diversified data. The choice of an alternative route may notably take into account data external to the avionics (e.g. weather).

Advantageously, the invention allows access to data on open networks, while minimizing the risks in terms of intrusion or of injection of unreliable data.

Advantageously, the invention makes it possible to exploit human-machine interaction methods and systems that are modern, reliable, robust, proven or even de facto standards, with a fast learning curve (e.g. touchscreens, force feedback screens, augmented reality and/or virtual reality).

Advantageously, the use of one or more external computers makes it possible to benefit from enriched mission management, accompanied by secure exchange means and by comparison and verification means, allowing a reliable and easy transition to the avionic navigation computer and the execution of the mission.

Advantageously, the invention may be applied for managing a flight or a mission of an aircraft, be this before or during the flight.

Advantageously, the invention may be implemented on tablets able to be used on board or on the ground outside the aeroplane. It may be deployed on EFBs on board the aeroplane. It may also be provided on the ground in the airline operational centre, by ensuring the exchanges with the avionics through ground-air data linking functions.

BRIEF DESCRIPTION OF THE DRAWINGS

Various aspects and advantages of the invention will appear in support of the description of one preferred, but non-limiting, mode of implementation of the invention, with reference to the figures below.

DETAILED DESCRIPTION

Mission management for an aircraft, whether it relates to passenger transport, civil freight transport or a military mission, is becoming increasingly complex. This complexity hinges on several factors relating notably to the amount and to the diversity of the data that are manipulated (or able to be manipulated) and to the computing power able to be drawn upon.

On the one hand, information relevant for defining the mission is becoming increasingly complex (e.g. change of atmospheric phenomena over space and over time, surrounding air traffic, current and future air traffic along the flight, consideration of more complex needs of the customers in terms of services or of availability of infrastructures, complexity of missions and of tactical and geostrategic threats).

On the other hand, determining an optimum solution, or sometimes even one that is simply satisfactory, is based on complex processing operations, and may require, in addition to automation, manual adjustment of the proposed solution, or of the computing assumptions, by the operator.

This increasing complexity of mission management is not readily compatible with the requirements in terms of robustness and of reliability of on-board avionic systems, which may constitute a major hindrance to implementing operationally efficient solutions.

However, increasingly complex operational data relevant for optimizing the mission are or become available, which data are accessible via data networks whose efficiency is continuously increasing. Computing power is also increasing: computing capabilities available on small-format tablets allow the development of efficient and complex optimization tools, the complexity of which, however, means that making them reliable would be too expensive to contemplate integrating them into the avionics.

The methods and the systems according to the invention advantageously integrate avionic and non-avionic systems in certain specific contexts and for certain specific objectives.

Figure 1:
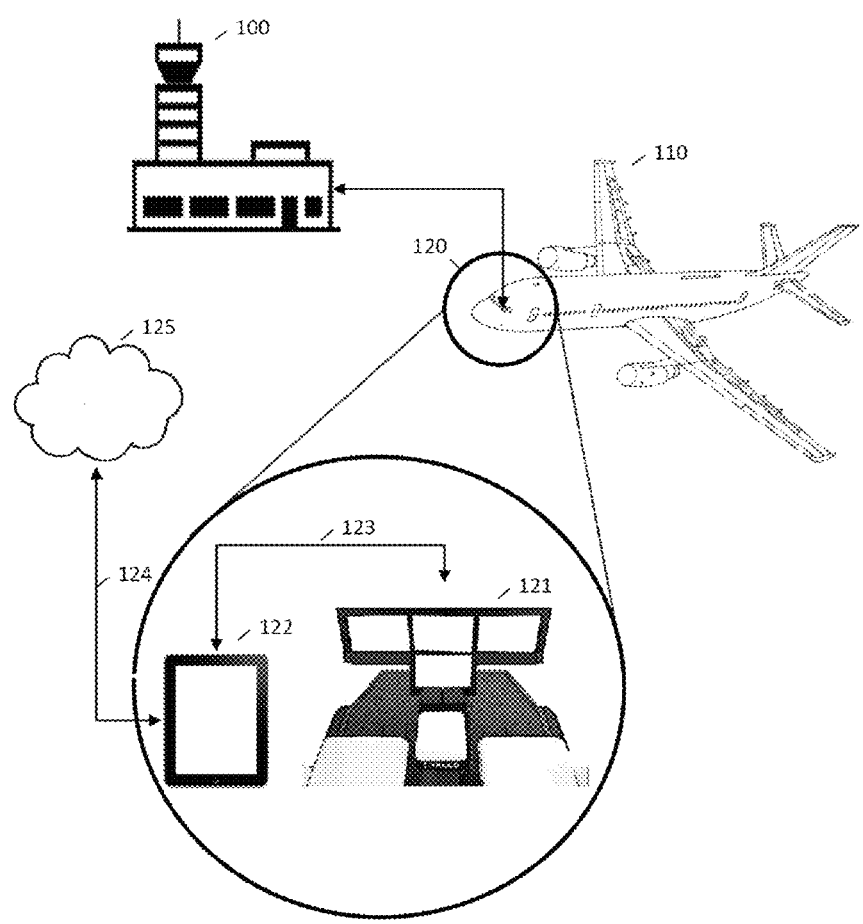
FIG. 1 illustrates the overall technical environment of the invention.

FIG. 1 illustrates the overall technical environment of the invention.

The figure shows examples of systems (or 'equipment' or 'instruments' or 'hardware' or 'devices' or 'means') of 'non-avionic' or 'open (world)' type, and equipment of 'avionic' type (certified by the regulator).

An aircraft is a transport means capable of moving in the Earth's atmosphere. For example, an aircraft may be an aeroplane or a helicopter (or even a drone). The aircraft comprises a piloting cabin or a cockpit 120. Inside the cockpit is piloting equipment 121 (termed avionic equipment, which is certified by the aeronautical regulator) and optional equipment (termed non-avionic or 'open world'). In the case of a drone, the aircraft comprises on-board avionic equipment, and the optional equipment and the interfaces with the operator are remote on the ground.

An 'avionic system' (or 'system of avionic type') is a system having specific technical features in comparison with a 'non-avionic' system (or 'system of non-avionic type' or 'open world type'), these technical features being certified administratively by a trusted authority (in this case the aeronautical regulator). Technically, delegations of authorities may in the future allow technical management of this administrative management (e.g. cryptoledgers).

With regard to the distinctive technical features of an avionic system, a system—generally, i.e. avionic or non-avionic—may have or be associated with a predefined failure rate (from a predefined failure rate range), a failure rate comprising or determining a predefined execution error rate. In one embodiment, the failure rate of an avionic system is lower than the failure rate of a non-avionic system. In one embodiment, the failure rate of an avionic system is significantly or substantially lower than that of a non-avionic system.

An avionic system denotes a reliable system (or a system with guaranteed reliability). It is a system the failure of which has consequences that exceed accepted or acceptable and therefore critical limits. A failure may be characterized by the loss of the function under consideration, or by the production of erroneous data, with or without detection of an error. Depending on the level of criticality of the critical consequences, the probability of occurrence must be keep below a threshold of acceptability. Thus, the more critical the consequence, the lower the acceptable probability of occurrence. For example, in aeronautics, a catastrophic event (multiple deaths) will have to have a probability of occurrence of less than $10^{-9}$ per flight hour, while a major incident (reduction of the safety margins and of the operational capabilities, discomfort or minor injuries) will have to have a probability of occurrence of less than $10^{-5}$ per flight hour. To meet these objectives, the architecture of the (reliable) avionic system and also the design of each component guarantee this probability of occurrence through guarantees of fault rate for each equipment item (physical faults) and verification levels (functional and structural test coverage) of the software.

These demands impose a significant design and verification effort, and impose a limitation on the complexity of the processing operations that are implemented.

On the other hand, the failure of an unreliable system, or a system with non-guaranteed reliability (non-avionic system), has consequences that are deemed to be tolerable, non-critical, or even not to have a significant operational impact. The demands on the architecture, the physical components or the software processing operations are therefore lower, and permit more complex processing operations and development and verification efforts that are lower in comparison with a reliable system.

Generally, an avionic system is associated with a physical fault rate that is lower and a logic verification that is higher than that of a non-avionic system.

In order to use, during in-flight operations, data originating from an unreliable computer, on account of the fact that the reliability of the data is not guaranteed (or guaranteed with an error rate higher than the demands of the reliable system), it is advantageous to use the method according to the invention. The steps of the method make it possible notably to ensure that no erroneous item of data is used operationally by the reliable system. The steps may comprise verification by the human operator, followed by manual entry or automatic transmission, or else various means for verifying the transmitted data. In some embodiments, it is also possible to have steps of computing or of verifying the coherency of the data from the non-avionic system performed by the avionic system (for example, it may be verified that a path is constructed with known points and that it is able to be flown).

The failure of a system may be ascertained deterministically, but also probabilistically.

In one embodiment, an additional comprehensiveness criterion makes it possible to qualify the criterion of the failure rate. This comprehensiveness criterion denotes the coverage of the tests (excitations, challenges not necessarily having a known response) and/or verifications (e.g. comparison of the produced response with the one that is known and expected) that have been performed beforehand on the avionic system or non-avionic system in the determination of the failure rate. In one embodiment, the comprehensiveness of the tests and/or verifications performed is greater in an avionic system in comparison with a non-avionic system.

In one embodiment, in addition to the overall failure rate of the avionic system or non-avionic system, the failure rates specific to the components of the avionic system or non-avionic system may be taken into account, as well as the propagation of the failures.

The avionic equipment (hereinafter 'the avionics') 121 comprises for example one or more on-board computers (computing, storage and data storage means), including a flight management system (FMS in acronym form), human-machine interface means, such as display means (e.g. screens incorporated into the avionic equipment) and/or data entry means (e.g. keyboards, buttons, cursors, rotary controllers, etc.), communication or haptic feedback means. By extension, the avionic systems may comprise remotely accessible systems, for example to air traffic control and/or to an operational centre, which may be in (two-way) communication via ground-air links. Moreover, the air traffic control 1001 and/or operational centre systems may access (e.g. receive, collect, select, come across, determine) open data sources (e.g. non-regulatory weather data), for example accessible from the Internet and the coverage and depth of which covers the entire flight of the aircraft.

Non-avionic systems 122 denote on-board devices or devices on the ground that may for example comprise one or more computerized tablets or EFBs ('electronic flight bags') that are portable or integrated into the cockpit, viewing means (e.g. additional screens, smart glasses, head-up displays, projectors, holographic systems, virtual-reality and/or augmented-reality headsets termed 'wearable computers' or 'head-mounted displays', etc.), and also interaction means (e.g. laser-projection keyboards, fold-out components, roll-out components; haptic, force feedback, mechanical, pneumatic and electrical systems; dictation or voice recognition means with noise suppression, etc.).

An EFB or, generally, a non-avionic equipment item may interact (unidirectional or two-way communication 123) with the avionic equipment 121.

The avionic and/or non-avionic systems are in communication with an air-craft 110 (e.g. its cockpit, instrument panel, etc.).

One or more non-avionic systems may also be in communication 124 with external computer resources, accessible via the network (for example cloud computing 125). In particular, the computations may be performed locally on the EFB or partially or entirely in the computation means accessible via or through or in the network.

The on-board equipment 121 is generally certified and regulated, whereas the EFB 122 and the connected computing means 125 are generally not certified (or are to a lesser extent). According to the embodiments (types of integration 123), the architectures able to be implemented make it possible to inject flexibility and functional capabilities from the open world (e.g. via the EFB 122) while providing (controlled) safety on the part of the on-board avionics 121.

Figure 2:
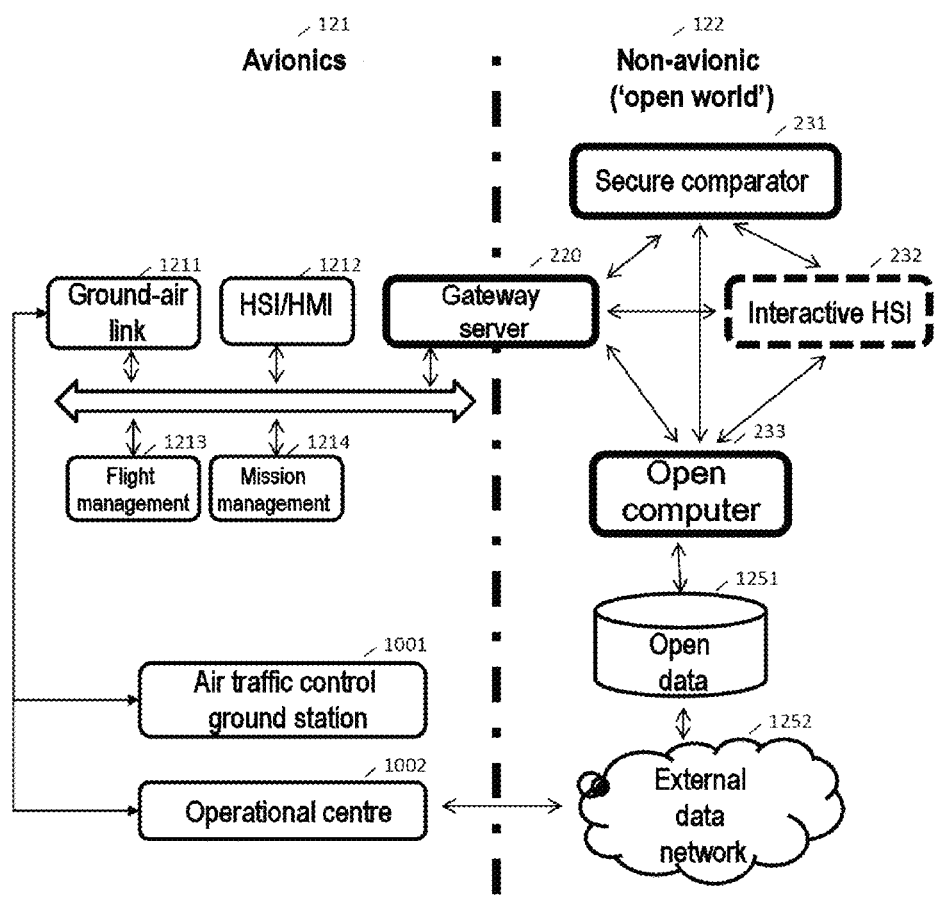
FIG. 2 illustrates examples of integration of avionic systems with non-avionic systems.

FIG. 2 shows examples of avionic systems, examples of non-avionic systems and also examples of integration between these two types of system.

Avionic systems 121 may notably comprise a ground-air digital linking device 1211, human-machine interfaces HMI or human-system interfaces HSI 1212, one or more aircraft flight management systems 1213, and one or more mission management systems 1214.

By extension, the avionic systems 121 may comprise remotely accessible systems, for example to air traffic control 1001 and/or to an operational centre 1002, which may be in (two-way) communication via ground-air links. Moreover, the air traffic control 1001 and/or operational centre 1002 systems may access (e.g. receive, collect, select, come across, determine) open data sources (e.g. non-regulatory weather data), for example accessible from the Internet.

According to the embodiments of the invention, non-avionic systems 122 may comprise one or more of the following systems: a comparator 231, for example of secure type, human-machine and/or human-system interface equipment 232, one or more open computers 233 and a gateway system 220.

Principles of Regulation

The regulation of the interactions between the avionic systems 121 and non-avionic systems 122, i.e. the rules for managing the data exchanges, may be varied depending on the embodiments. They may be small in number and therefore quick and effective. They may also be complex and involve several actors, that is to say result from the combined intervention of humans or machines.

Generally, the methods of communication between the two types of system, avionic system and non-avionic system, cover different aspects or parameters:

a) directionality; the communication between the two types of system (e.g. data flow, message passing, etc.) may be unidirectional or bidirectional. This directionality property may be static (does not vary over time) but may also change over time (in predefined intervals of time and/or depending on predefined events), for example depending on the flight context or phase. For example, the communication may be bidirectional when the aeroplane is on the ground at its boarding gate, and unidirectional once it starts moving. In this example, when the aeroplane is on the ground, any modification proposed by the non-avionic system to the avionic system may be verified and, if it were to be erroneous, it would not reduce the safety insofar as this modification could still be modified and corrected. Once movement starts and in flight, the communication takes place first of all only from the avionic system to the non-avionic system, any item of data produced by the non-avionic system not being able to be transferred automatically to the avionic system.

b) form (e.g. data format, protocol type, translation/bridging, etc.). For example, a WiFi or wired Ethernet protocol may be best optimized on the ground (given the large volume that may be exchanged on the ground to initialize the mission), while a more secure but lower-throughput protocol may be preferable in flight, given the on-board communications architectures (AEEC ARINC 653) that may require the bandwidth and the integrity to be guaranteed for all of the critical computers and may therefore limit de facto the throughput and the type of data exchanged with the non-avionic system.

c) background (quality e.g. nature of the communicated objects, e.g. flight plan points or 3D path, etc.; data regarding the data, i.e. metadata; raw or static data; executable data, i.e. programs). A non-avionic system, in addition to the flight plans, is able to receive a large amount of rich data only part of which will be utilized by the avionic system: aeronautical maps, high-resolution geographical maps, complete weather maps. The avionic system may use a sub-part of the data, which are filtered for the needs thereof (for example filtering along the flight plan, filtering of the resolution suitable for its memory limitations, for its limitations in terms of computing power, etc.).

d) amount (or volumes). A non-avionic system may use rich data (there is no actual limitation in terms of the processor, memory and storage; powerful multicore processors may be used, while the avionic system computers have a hardware architecture that is very robust but much more limited in order to guarantee the testability of the required performance, for example with properties of resistance to high-energy particle events during the flight (SEU, NSEU), of resistance to vibrations or to extreme temperatures. Avionic system computers generally have significantly less power than non-avionic computers.

e) privileges or priorities (e.g. overall priorities may be allocated; for example the 'master' avionic system will be associated with a priority higher at all times than the 'slave' non-avionic system; 'administrator' or 'read/write' privileges will be allocated to the various parts for example in terms of access, reading from and/or writing to one or the other type of system).

The regulation of the data exchanges may govern each of these aspects differently and combine them in a particular way. According to the embodiments, (scalable or non-scalable) master/slave systems or (scalable or non-scalable) peer-to-peer networks will be obtained, comprising numerous and varied feedback actions (e.g. feedforward, etc.).

By way of example of one particularly advantageous combination in the avionics sector, the communication between avionic system and non-avionic system may be bidirectional but asymmetric (more data escapes from the avionic system than data that are reinjected thereinto), without control over the output of the avionic system but with dual control over the data reinjections, in terms of i) nature of the reinjected data (e.g. only some avionic objects are authorized) and of ii) volume of data (e.g. in order to avoid overburdening the FMS core). Mechanisms for filtering by types of object may be implemented. Beyond format tests, logic tests on the data may be performed. The volume of the data manipulated by the avionic core may be controlled depending on a measurement of the load and/or of the processing capability of the avionic core (feedback control).

Gateway Server

In one embodiment, a third-party entity (regulatory body) establishes the link between the avionic system(s) and the non-avionic system(s).

For example, an intermediate entity or 'gateway server' 220 may regulate the exchanges.

In one embodiment, the gateway server 220 (e.g. techniques, steps, one or more dedicated systems, etc.) allows the alternative route of non-avionic origin to be loaded into the avionic computer (navigation computer), for example via the gateway server 220.

In one embodiment, a gateway server is a passive storage space. It inserts (in queued form) the elements computed by the non-avionic systems and transmits them in fine to the avionic systems. The gateway server then serves as a buffer memory or buffer between the two types of system. In one embodiment, the gateway server may order the queue, for example depending on the priority associated with the various objects placed in the queue, depending on the flight context and/or the use of the avionic resources that may be, as the case may be, underburdened or overburdened, etc.

In one embodiment, the gateway server between avionic system and non-avionic system is an active storage space, i.e. which adds logic processing operations to the received data. The gateway server may perform one or more of the following actions: perform its own verifications with regard to the conformity of a route with respect to the avionic criteria, integrate through redundancy one or more of the functions devolved to the comparison block 231, HMI block 232 or FMS computation block 233 (for dual verification purposes for example), receive instructions from a third-party system, etc. In one embodiment, the gateway server 220 may verify the conformity between the path computed in the avionics and the path originating from the computation outside of the avionics.

In particular, the gateway server between avionic system and non-avionic system as a component critical to the interface of the two types of system may be subject to dedicated security measures (for example independently of the other systems). The gateway server may be secured through various means, comprising notably one or more of the mechanisms comprising encryption of the data (for example with asymmetric keys), authentication mechanisms (that are for example biometric), self-monitoring mechanisms (e.g. state machine, 'watchdog'), anti-intrusion mechanisms (e.g. IDS), mechanisms for continuously verifying the integrity of the data manipulated in the gateway server, sharing of a prior secret, etc.

In one embodiment, the gateway server between avionic system and non-avionic system may be agreed (or recognized or accepted or authorized) by the non-avionic systems on the one hand and the avionic systems on the other hand, intermittently, regularly or on demand. In one embodiment, one or more voting mechanisms may allow on-demand denial or rejection of the gateway server, which would be considered to be corrupted (for example if at least one of the avionic systems determines it to be such; other models may provide for majority votes, etc.).

Comparator

In one embodiment, the function of the comparator 231 (or comparison function or step) aims to compare the alternative route on the one hand and the route present in the avionic navigation computer on the other hand.

In one embodiment, the comparator aims to identify the operational gains and/or to verify the conformity of the route loaded into the avionics.

The comparator 231 and/or the interfaces 232 and/or the open computer 233 and the gateway system 220 may interact in various ways.

The granularity or the perimeter of the comparisons is variable or able to be configured (only the final results may be compared and/or the intermediate results and the conditions regarding the limits may also be compared, etc.). The comparison methods may be varied (e.g. like-for-like comparison or comparison modulo tolerances, depending on the predefined models).

In one embodiment, the avionic code of the FMS is executed in the computer 233, in exactly the same way as it would be in the native avionic system. The results that are obtained are then sent and analysed by the comparator 231, which, if necessary, communicates the differences between the elements computed avionically on the one hand and non-avionically on the other hand to the pilot via the interface 232 (optionally, thresholds or threshold ranges may be applied if models that are not shown allow management of systemic risks, e.g. a difference in value of 1% for certain types of value may lead to catastrophic consequences, whereas other types of parameter may be less sensitive; moreover, the combinations of such differential values may also be considered). After for example express authorization on the part of the pilot, possibly secured by entering a code or an authentication (which is for example biometric), the authorized data are transmitted to the avionic systems 121 via the gateway server 220.

Human-Machine Interfaces

In one embodiment, the HMI/HSI interface 232 may comprise one or more display screens and/or interaction systems 232 linked to this computer, allowing the operator to view the results determined by the non-avionic systems and to manually adjust the solution or particular features of this solution; for example, the pilot may view the result of the computations on the screen of the tablet (but in some embodiments this information may be projected or displayed through superimposition, using augmented reality, etc.).

The display devices may comprise or implement one or more devices, such as virtual-reality headsets and/or augmented-reality glasses (e.g. 'head-mounted display', 'wearable computer', 'glasses' or a headset-mounted display) and/or projection devices (that are e.g. holographic). A virtual-reality headset worn by the pilot may be opaque or semi-transparent or be able to be configured in terms of transparency. The display may be a 'head-up' display. The headset may comprise one or more computing and communication, projection, audio capture, video projection and/or capture devices (for example for capturing or 'scraping' accessible data in an analogue fashion from the cockpit or the piloting cabin of the aircraft). The cockpit of the aircraft may also comprise voice command devices. The on-board instruments may advantageously allow the pilot to view his flight plan or his path in 3D, and notably the various alternative routes according to the invention. The pilot may for example view—for example by superimposing these alternative routes onto his real surroundings—the points where the path is able to be joined when said points are still possible (changing from one route to another). Lastly, haptic feedback devices incorporated into the system for implementing the invention may enrich the choice of the routes and the guidance/piloting (specific vibrations when effectively crossing a waypoint, etc.). In one embodiment, viewing of the various alternative routes may be enriched by an interaction with regard to the predicted time, so as to change the predicted situation of the aircraft and the context over time, from the start to the end of the mission. The interaction with regard to the predicted time may be performed for example by tactile interaction, a pointing device, or a mechanical device such as a rotary controller.

With regard to the display, the information may be displayed in one or more virtual-reality and/or augmented-reality headsets. The information may therefore be entirely virtual (displayed in an individual headset), entirely real (for example projected onto the flat surfaces available in the real environment of the cockpit of the aircraft) or a combination of the two (partly a virtual display superimposed on or merged with the reality and partly a real display via projectors). The display may also be characterized by the application of predefined position rules and display rules. For example, the human-machine interfaces (or the information) may be 'distributed' (divided into separate portions, which are possibly partially redundant, and then distributed) between the various virtual or real screens.

Open Data

In one embodiment, the open computer 133 (actively) accesses and/or (passively) receives information from external sources 1251, which information is provided by one or more external data networks 1252, these external networks also interacting with one or more operational centres.

With regard to the data gathered over the externally open networks (1251, 1252), said data may be bulky (in terms of amount, e.g. quantity, diversity), complex (in terms of quality, e.g. reliability, variable obsolescence, variable formats), multidimensional (in time and in space, i.e. integrating the present and also the future, comprising for example predictions of change over time, possibly accompanied by degrees of reliability, or else variants associated with probability or statistical criteria).

These data may relate to weather data, such as the wind and the temperature sampled according to altitude, geographical position and at various predicted times; and/or the state of air traffic, either in terms of planned paths of the various aircraft on the sectors that are encountered or traffic densities by sectors, with forecasts over time, or statistical variants of the change in the traffic; and/or geometric areas (polyhedra, or polygons by sections of altitude) defining danger areas, areas to be avoided or phenomena influencing the flight, and their change over time: clouds of volcanic ash, areas of atmospheric turbulence, of convection (storms), of ice, or else military exclusion or tactical risk areas; and/or discretized information in the form of digital maps: weather radar images, digitized topography; and/or static or mobile one-time obstacles: aircraft, air balloons, tactical threats, etc.

All of these open data may influence the mission, and may potentially be taken into account when developing an alternative route.

Their spatial extent and their change over time may also be taken into account in an automatic route computation. Furthermore, the raw and/or processed data may be displayed to the pilot in order to evaluate the impact on the actual route (or on the alternative route being developed).

In addition to this information, specific aeronautical data may be taken into account, for example from air navigation databases, incorporating airports, arrival and departure procedures, radio beacons, navigation points, airways, regarding geographical areas relating to the mission or regarding the entire globe; or else sectorization of the airspace, with air control areas, oceanic air navigation tracks and state borders.

Another example of open data relates to the structure of the airspace. In one embodiment, what is termed the open computer 233 may take into account the structure of the air control sectors, such as the TMA ('terminal manoeuvring area') of various airports, the route control sectors defined by geographical limits or altitude levels, and also the borders between regional air traffic control centres (CRNA in France) or between countries, so as to allow definition of a route that best incorporates the air traffic and that is likely to be accepted by local air traffic control.

The information outlined above may be taken into account for determining an optimized route that is best incorporated into the controlled airspace and/or that optimally utilizes the free navigation areas (termed 'free routing').

In some embodiments, the (i) communication interfaces external to the avionics (1251, 1252) and/or the (ii) computing means external to the avionics 233 and/or the (iii) human-system interaction systems HMI 232 external to the avionics may be used as much as possible (maximum delegation mode). The use of these methods may therefore be optimized (and therefore in particular maximized).

Figure 3:
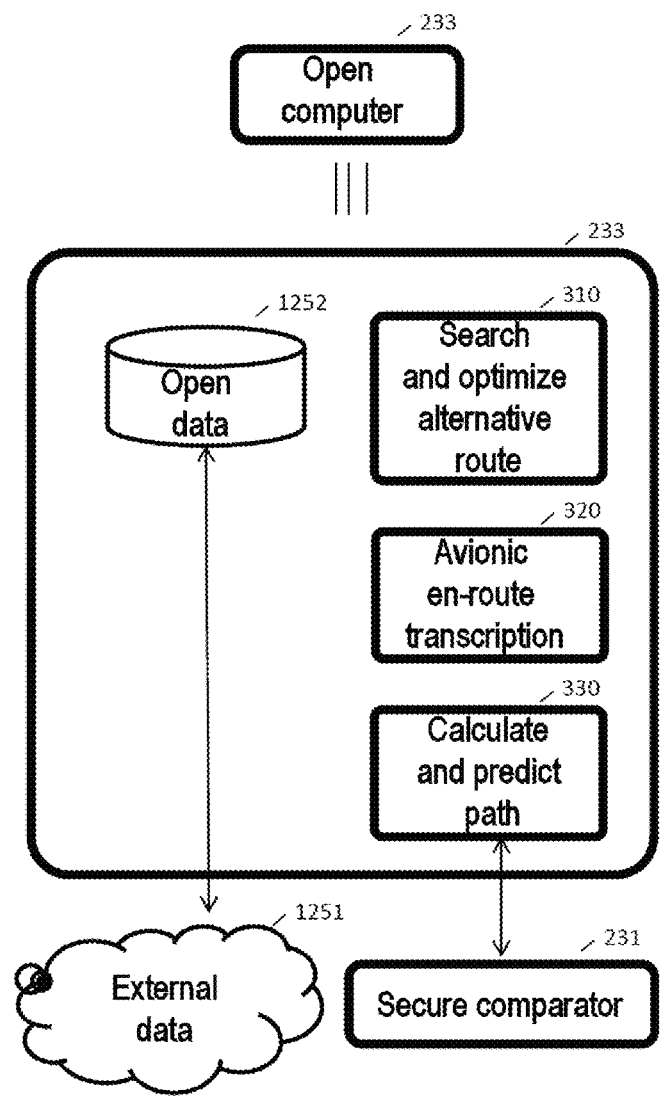
FIG. 3 illustrates various embodiments of the open computer.

FIG. 3 illustrates various embodiments of the open computer 233.

The figure shows, in greater detail, examples of components of the computer 233. The open computer 233 comprises hardware and software code that is executed on this hardware, implementing steps for determining one or more alternative routes.

Several complementary types of processing operation may generally be distinguished within this computer. These types or classes of processing operation are symbolized by searching and optimization blocks 310, and avionic en-route transcription steps 320 (adaptation, translation, etc.), which lead to computations and predictions of paths 330. Lastly, the paths that are produced are manipulated in the comparator (possibly secure comparator 231).

The computer 233 performs (complex) path optimization or searching processing operations 310. The search spaces may be of large size, the search methods may be varied, deterministic or non-deterministic, global or local, with path modelling forms suitable for the search method.

The computer 233 may perform path prediction computations that are identical, or functionally equivalent, to those performed in the avionic system. The computing and prediction processing operations are intended notably to allow comparison with the path computations of the avionic system, either for the purpose of estimating benefits or for the purpose of verifying conformity. They therefore reproduce as far as possible the processing operations as they will be applied by the avionic system. In order to reproduce these computations accurately, several embodiments are described.

In one embodiment, a structurally identical code (the same source code) is executed (possibly recompiled or transcribed for the non-avionic computer).

In one embodiment, a functionally equivalent code is executed. The result of the execution of this code is representative of the one produced by the avionic system.

The optimization steps of the block 310 may use, in a non-limiting manner, operational search steps comprising heuristics, such as A-star algorithms, or steps of probabilistic methods (such as genetic algorithms). Some processing operations may make use of big data processing operations, or be based on highly parallel processing architectures. Computing resources that are accessed remotely or are on board (e.g. high-performance GPU computation) may be drawn upon, for example as a backup. A global search method, which is possibly inaccurate, may be supplemented by local optimization, applying non-linear optimization techniques or potential field-based algorithms. These methods are characterized by a combination, and sometimes a non-determinism, or convergence properties, that would not make it possible to guarantee the reliability required by the avionic system. Moreover, these search and optimization processing operations take into account a wide variety and a high complexity of input data originating from diverse and non-guaranteed sources: real-time, predictive or statistical information relating to the weather, air traffic or any other operational context element. Such variability of the input data would make it very complex, if not impossible, to guarantee reliability of the result.

To allow the search and optimization processing operations to move to the computation and prediction processing operations in the same way as the avionics, the search and optimization results are transcribed (block 320) into a format that is functionally equivalent to the one manipulated by the avionic system.

In terms of hardware, the computer 233 may be implemented on a tablet or laptop (or on any other computing means external to the avionics, for example via remote access) allowing the alternative routes to be determined (e.g. sought, evaluated, selected, etc.). It may also be based on computing infrastructures on the ground, based on distributed or massively parallel architectures.

Figure 4:
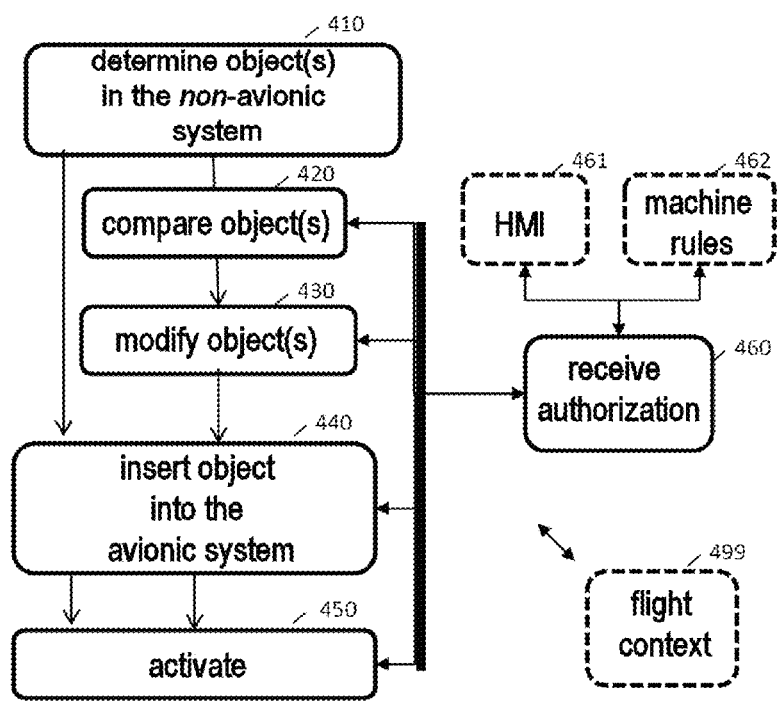
FIG. 4 shows examples of steps of an embodiment of the method according to the invention.

FIG. 4 shows examples of steps of an embodiment of the method according to the invention.

A method for managing a route of an aircraft is described, implemented in a system comprising an avionic system and a non-avionic system, comprising the steps:—determining an alternative route to the current route in the non-avionic system;—receiving an authorization to insert said route into the avionic flight management system;—inserting said route into the avionic flight management system.

The step of determining an alternative route in the non-avionic system may be performed in various ways (execution of a software code strictly identical to the one executed by the FMS, equivalent functional code, pseudo-code, etc.).

The term 'insert' refers to a flight plan revision. The term 'activate' means that the route becomes the control reference and will effectively be flown. An insertion is therefore prior to an activation, and is the very first operation for taking into account the non-avionic original computation.

The step of receiving an authorization to insert said alternative route into the avionic flight management system may be performed in various ways (pilot and/or machine confirmation loop). A variant to the mission may be submitted to the pilot for assessment (e.g. correction, annotation, confirmation, adjustment). Decision systems may evaluate (grade, simulate, quantify, emulate, etc.) the criticality of the alternative route before possible reinjection.

Once confirmed by the human and/or the machine, the non-avionic original route is injected into the non-avionic systems.

In one embodiment, the method comprises the step of inserting and/or activating the verified alternative route in the avionic flight management system. In one embodiment, there may be prior insertion into the avionic system, and then verification, and then, lastly, activation of the route as flight reference.

In one embodiment, the step of determining an alternative route in the non-avionic system comprises the execution, in the non-avionic system, of a software code identical to the one implemented in the avionic flight management system.

In one embodiment, the step of determining an alternative route in the non-avionic system comprises the execution, in the non-avionic system, of a software code functionally equivalent to the one implemented in the avionic flight management system.

In one embodiment, the authorization to insert said alternative route is received from a human-machine interface and/or is authorized by an avionic system.

The pilot has a privileged role in that he is responsible for injecting data of non-avionic origin into the avionic systems. The authorization may result from a joint human-machine action in various configurations (machine pre-evaluation and human confirmation, or, on the other hand, voting mechanisms, etc.).

In one embodiment, the insertion authorization is conditional on a step of comparing the alternative route determined in or by the non-avionic system with the current route determined in or by the avionic system.

In one embodiment, the comparison is relative, and is 'safe' because it is direct: the new (candidate) route is compared with the current or ongoing route (confirmed by the avionics).

The comparison, whether graphical or not, makes it possible to evaluate the operational gains (or losses) and therefore the relevance of inserting the route into the avionic system.

The criteria may comprise one or more of the criteria comprising an operational gain or loss in terms of flight time, fuel consumption, distance to a weather disturbance, exposure in terms of time and/or in terms of intensity to a weather disturbance.

In one embodiment, the method comprises the step of evaluating or verifying the determined alternative route according to predefined criteria.

In one embodiment, the comparison is 'absolute' and indirect: the alternative candidate route is evaluated according to predefined criteria that themselves reflect the avionic requirements. It is implied that this step is performed before the insertion or the activation of said route (which may take place only if the evaluation is positive, i.e. exceeds a predefined threshold).

In one embodiment, the method comprises a step of evaluating or verifying the conformity of the determined alternative route with predefined criteria. The evaluation may consist in grading or assigning a score to the candidate route.

This conformity verification or evaluation step may be performed at any time (creation of the route, submission via the HMI, including after confirmation by the pilot where appropriate). The criteria may correspond to bounds, limits or envelopes, as given by the flight management system FMS.

In one embodiment, the evaluation may be deterministic. In one embodiment, the evaluation may be probabilistic. The criteria may take into account the systemic risks of injecting data.

The evaluation and verification functions that are invoked may be 'qualified', i.e. verify the conformity of the computations with coherent accuracy thresholds for the navigational accuracy required for the mission (RNP), and/or be coupled to the interactive display means so as to allow visual comparison of the results.

In one embodiment, the method comprises the step of modifying the determined alternative route.

The step of modifying the route may be iterative (e.g. involve optimization steps). It may be performed by a variety of actors (e.g. pilot, ATC) and/or machines. It may be performed before insertion or activation in the avionics. It may result from a set of parameters that are predefined and/or computed dynamically. HMI means may or may not be used (modifications triggered by automatic processing operations without a graphical loop).

The modification operation may in particular comprise operations intended to preselect, filter, partly modify, confirm or, by contrast, suppress the determined route.

In one embodiment, the step of modifying the determined alternative route comprises one or more steps of combinatorial optimization and/or of multi-objective optimization, depending on one or more parameters selected from among the parameters comprising the present and predicted weather conditions through which the aircraft is moving, the surrounding air traffic, the structure of the airspace, the airport services of the destination or diversionary airport, the load factor and/or the passenger comfort that is estimated and associated with said route, the fuel cost, the flight time, the punctuality of the flight, the operational flight cost, the availability of the flight crew, the availability of maintenance hardware, environmental criteria, compliance with AOC company rules and ATC regulations, the probability of acceptance of the alternative route in terms of AOC and/or ATC negotiation.

The optimization that is performed by the method according to the invention may be of various natures. The optimization may be 'combinatorial' (discrete optimization), consisting in finding, in a discrete set, one from among the best subsets (or solutions) able to be implemented, the idea of a best solution being defined by a (single) objective function. The optimization may also be 'multi-objective' (i.e. seeking to simultaneously optimize several objectives for one and the same problem).

The criteria may be varied. Other additional parameters may also relate to the taking into account of NOTAM messages, the evaluation of the cognitive load for the pilot, and more generally the service infrastructure in and around the airport.

The number of parameters or constraints may for example be gradually incremented or decremented, the parameters may be of equal importance or hierarchized (e.g. weighted).

In one embodiment, the human-machine interface displays the determined alternative route and the current route of the aircraft by juxtaposing them.

In one embodiment, the reference route originating from the avionics and the alternative route being developed are displayed simultaneously.

In one embodiment, the human-machine interface comprises at least one cursor configured to trigger the display of one or more flight parameters associated with the determined alternative route over time depending on the movement of said cursor.

In one embodiment, the pilot may view the change in the situation over time along the route, by acting on a time parameter (for example by sliding a marker along a time scale of 'slider' type), in order to view the state of the predicted contextual data (traffic, weather, danger areas or areas of disturbance), and also the predicted position of the aircraft on each of the paths.

In one embodiment, the method comprises the step of receiving data of non-avionic origin in order to determine an alternative route to the current route in the non-avionic system.

The same remarks with regard to the avionic versus non-avionic nature apply to the data. An item of data, whether of avionic or non-avionic origin, remains an item of data. However, the origin or the source of the item of data reflects the measured trust in terms of reliability and/or accuracy associated with said item of data (attribute of the item of data, item of data regarding the item of data, i.e. item of metadata).

In one embodiment, one or more steps are triggered depending on the flight context.

For example, the presence or absence of an HMI interaction for the purpose of authorizing insertion and/or activation may be conditional upon a flight phase considered to be critical. The optimization step may itself also be controlled depending on the flight phase (more or fewer criteria may be taken into account). More generally, each of the steps mentioned above may be adjusted or influenced or parameterized depending on the phase or on the flight context.

Flight Context

In some embodiments, one or more of the steps of the method (e.g. type of test performed for agreeing to or denying the insertion and/or activation authorizations, moment selected to ask the pilot for an advisory opinion or formal authorization, selection of one or more criteria taken into account for determining the alternative route, etc.) may be controlled depending on the flight context of the aircraft (e.g. flight phases).

The flight context at a given moment incorporates all of the actions taken by the pilots (and notably the effective piloting instructions) and the influence of the external environment on the aircraft. A 'flight context' comprises for example one situation from among predefined or pre-categorized situations associated with data such as the position, the flight phase, the waypoints, the current procedure (and others). For example, the aircraft may be in approach phase for landing, in take-off phase, in cruising phase but also in level ascending, level descending, etc. (a variety of situations may be predefined). Moreover, the current 'flight context' may be associated with a multitude of attributes or of descriptive parameters (current weather state, state of the traffic, status of the pilot, comprising for example a stress level as measured by sensors, etc.). A flight context may therefore also comprise data, which are for example filtered by priority and/or based on flight phase data, weather problems, avionic parameters, ATC negotiations, anomalies linked to the status of the flight, problems linked to the traffic and/or to the topology. Examples of 'flight context' comprise for example contexts such as 'cruising phase/no turbulence/nominal pilot stress' or indeed 'landing phase/turbulence/intense pilot stress'. These contexts may be structured according to various models (e.g. hierarchized for example in a tree or according to various dependencies, including graphs). Context categories may be defined, so as to synthesize the needs in terms of human-machine interaction (e.g. minimum or maximum interaction period, minimum and maximum number of words, etc.). Specific rules may also exist in some contexts, notably emergencies or critical situations. The context categories may be static or dynamic (e.g. able to be configured).

The method may be implemented in a system comprising means for determining a flight context of the aircraft, said determination means comprising in particular logic rules, which manipulate the values as measured by physical measurement means. In other words, the means for determining the 'flight context' comprise system means or 'hardware' or physical/tangible means and/or logic means (e.g. logic rules that are for example predefined). For example, the physical means comprise the avionics instrumentation proper (radars, probes, etc.) that make it possible to establish factual measurements characterizing the flight. The logic rules represent all of the information processing operations that make it possible to interpret (e.g. contextualize) the factual measurements. Some values may correspond to several contexts and, by correlation and/or computation and/or simulation, it is possible to decide between candidate 'contexts' by way of these logic rules. A variety of technologies makes it possible to implement these logic rules (formal logic, fuzzy logic, intuitionist logic, etc.).

A system for managing a route of an aircraft is described, comprising—a non-avionic system configured to determine one or more alternative routes to the current route of the aircraft;—a gateway system configured to receive an authorization to insert an alternative route into an avionic system;—said avionic system comprising a flight management system configured to insert said route into the avionic flight management system; an avionic system being associated with a physical fault rate that is lower and a logic verification that is higher than those of a non-avionic system.

In one embodiment, an avionic system comprises an avionic flight management system FMS and/or an air navigation traffic control system and a non-avionic system comprises an electronic flight bag EFB or a digital tablet.

Other embodiments or aspects of the invention are described hereinafter.

In step 410, an alternative or candidate route (or more generally an object) is determined (or created or developed) by one or more computers 233 whose hardware is of non-avionic type (i.e. not certified beforehand).

In one embodiment, a computer 233 makes it possible to compute a prediction for the path of the aircraft, for a chosen route, which draws on the same algorithms and the same flight performance models as the navigation computer of the avionics. Advantageously, the comparison of the results is thus reliable and meaningful.

In one embodiment, a computer 233 executes (exactly) the same software code (source code) as the one that is implemented in the certified avionic system. In one embodiment, the hardware is also identical. In one embodiment, a virtual machine is used (e.g. hypervisor).

In one embodiment, a computer 233 executes a software code (compiled code) that is 'functionally equivalent' to the one that is implemented in the certified avionic system. In one embodiment, the pseudo-codes (non-avionic on the one hand, avionic on the other hand) are identical. In one embodiment, they are similar (the differences relating to non-critical elements).

In the optional step 420, the routes A (according to the non-avionic system) and B (according to the avionics, based on the same input data) are compared, and the result of the comparison is the condition for whether a verification loop via the pilot is required or only optional. The comparison may be performed like-for-like or modulo tolerances (depending on the flight context, on the presence of critical parameters, etc.).

In one embodiment, the route (or the object) may be compared with the reference present in the avionics in order to evaluate the operational gains and the relevance thereof.

In one embodiment, the variants to the mission (flight plans, paths, etc.) may be submitted to the pilot for assessment (e.g. correction, annotation, confirmation, adjustment), who may evaluate the relevance thereof.

Where necessary, a step 430 of verifying and/or modifying the route (or the object) may be performed (open loop), for example by the pilot (or a group of individuals) and/or a machine decision system (e.g. third-party system, ATC etc.).

The verification of one or more conditions may be accompanied by an authorization 460 (e.g. code, signal, request, etc.) if a predetermined subset of these conditions is met (according to a model and thresholds or predefined threshold ranges).

In one embodiment, the route (or the object) is modified 430 into one or more of its points, using a human-machine interface 461.

In step 430, the unaltered or possibly modified route may be explicitly confirmed (or authorized) by the pilot. This route or object of non-avionic origin is then inserted (communicated, stored, manipulated) into the gateway server 220.

In one embodiment, the gateway server 220 is a passive storage space. It inserts (in queued form) the elements computed by the non-avionic systems and transmits them in fine to the avionic systems. The gateway server then serves as a buffer memory or buffer between the two types of system. In one embodiment, the gateway server may order the queue, for example depending on the priority associated with the various objects placed in the queue, depending on the flight context and/or the use of the avionic resources that may be, as the case may be, underburdened or overburdened, etc.

In one embodiment, the gateway server 220 is an active storage space, i.e. which adds logic processing operations to the received data. The gateway server may perform one or more of the following actions: perform its own verifications with regard to the conformity of a route with respect to the avionic criteria, integrate through redundancy one or more of the functions devolved to the comparison block 231, HMI block 232 or FMS computation block 233 (for dual verification purposes for example), receive instructions from a third-party system, etc.

In one embodiment, the gateway server 220 may verify the conformity between the path computed in the avionics and the path originating from the computation outside of the avionics.

In particular, the gateway server 220—as a component critical to the interface of the two types of system—may be subject to dedicated security measures (for example independently of the other systems). The gateway server may be secured through various means, comprising notably one or more of the mechanisms comprising encryption of the data (for example with asymmetric keys), authentication mechanisms (that are for example biometric), self-monitoring mechanisms (e.g. state machine, 'watchdog'), anti-intrusion mechanisms (e.g. IDS), mechanisms for continuously verifying the integrity of the data manipulated in the gateway server, sharing of a prior secret, etc.

In one embodiment, the gateway server may be agreed (or recognized or accepted or authorized) by the non-avionic systems on the one hand and the avionic systems on the other hand, intermittently, regularly or on demand. In one embodiment, one or more voting mechanisms may allow on-demand denial or rejection of the gateway server, which would be considered to be corrupted (for example if at least one of the avionic systems determines it to be such; other models may provide for majority votes, etc.).

The data transmitted or manipulated or modified by the gateway server 220 are then communicated to the avionic systems.

In one embodiment, the modified (or non-modified) and confirmed/verified/authorized route is 'inserted' 440 into the avionic system 121, that is to say that, at this precise instant, external data are taken into account in the certified flight management system (with a residual risk of malicious injection of data). The data may subsequently be activated in the reference flight plan.

In one embodiment, variants of the mission may therefore be injected or reintegrated into the avionic systems.

With regard to the human-machine interfaces HMI or human-system interfaces HSI 232, various embodiments may be contemplated. Specifically, the pilot may advantageously evaluate the relevance of the solution proposed by the computer, but also may also modify or adjust the solution depending on his own operational criteria, or in order to take into account operational constraints that are not taken into account by the automatic computation. To this end, modifications made to the existing graphical display screens may be implemented.

In one embodiment, the reference route originating from the avionics and the alternative route being developed are juxtaposed and displayed simultaneously.

In one embodiment, the pilot may view the change in the situation over time along the route, by acting on a time parameter (for example by sliding a marker along a time scale of 'slider' (type), in order to view the state of the predicted contextual data (traffic, weather, danger areas or areas of disturbance), and also the predicted state of the aircraft on each of the paths.

In one embodiment, the pilot may be provided with additional criteria in order to improve decision making. For example, there may be displayed operational gains in terms of flight time or of fuel consumption, the minimum distance to the disturbance, or the maximum exposure, in terms of duration or in terms of intensity, to a disturbance being passed through.

In one embodiment, one and the same graphical interface displays the route being developed on the open computer and the route defined in the avionic system.

The interface equipment may directly receive, from the avionics, the path data to be displayed so as to compare them with the alternative route, or else have a (reliable) importation of the path originating from the avionics, so as to manage them and then display them from the alternative route computer.

According to the embodiments, the operator may act directly on the points of the proposed route, in order to—add, delete, move a point of the route;—display and traverse the route via the points and the airways published in the navigation database;—display the air traffic control sectors and the oceanic navigation tracks in order to adjust the route accordingly;—display or modify a heading or a flight distance on a segment of the proposed route;—or else also propose adjustment of a heading or of a distance of the route according to a chosen criterion (flight time, slope to a constraint, descent and stabilization capability before the runway).

With regard to the data exchanges between the non-avionic systems 122 and the avionic systems 121, the exchanges of route information with the avionics may make it possible to have, in the open computer 233, a reliable item of information regarding the current reference route, and to reliably export the alternative route solution to the avionics so as to allow it to be taken into account and subsequently executed.

With regard to the insertion of the alternative route determined by the non-avionic systems, various embodiments are described hereinafter.

In one embodiment, the insertion of the alternative route into the avionic systems is performed by data link, for example by way of ground-air data links 1211 (use may be made of protocols for requesting routes via air traffic control centres 1001 or via company operational centres 1002). These requests allow in particular a new route to be loaded into the navigation computer 1213/1214, which may make it possible to load the alternative route, which is then loaded into a secondary flight plan and may become the navigation reference after confirmation by the operator. Other requests allow the route loaded into the navigation computer to be exported, and therefore allow it to be supplied to the alternative route computer.

Insofar as the alternative route computer may incorporate the same algorithms and the same flight performance models as the navigation computer, the recomputed path on this route may be considered to conform with the one present in the avionics. However, the conformity of the route is not able to be systematically guaranteed a priori. Once the alternative route has been loaded into the avionics, it is then that the pilot is able to verify the conformity thereof, evaluate the expected operational gains and, lastly, activate the flight of the aircraft on this new reference.

In some embodiments, the method may comprise a step of displaying (to the pilot) an interactive entry guide for the route, having for example manual entry interfaces and various values to enter, in order to guide him step by step in the entry of the alternative route on the navigation interfaces available in the cockpit.

Various embodiments for importing and/or exporting a route are described hereinafter.

In one embodiment, the secure gateway 220 allows data originating from the avionics to be transmitted externally ('exported'), without in any way compromising the safety of the flight.

In one embodiment, the secure gateway 220 may export (or transfer or communicate), externally (i.e. to non-avionic systems), the result of the path computation carried out by the avionic navigation computer. Using the computation that is carried out, an accurate representation of the navigation path may be achieved, which may be displayed to the operator (and used as subsequent reference).

When an alternative route has been loaded into the avionic navigation computer and the associated 'avionic' path has been computed, the reliable exporting of this path allows it to be displayed to the operator and allows verification of its conformity with the alternative path computed and displayed by the alternative route computer outside of the avionics.

With regard to the importing of data, the operations may be secured by various mechanisms.

In one embodiment, the secure gateway may allow a new route to be loaded directly, which route may be loaded into the avionic navigation computer. In general, such a request does not in any way compromise the safety of the flight, as the route is loaded into an alternative flight plan, which has to be confirmed by the pilot before being adopted or confirmed or authorized as new active reference for the flight.

This confirmation may be facilitated by a secure conformity verification that is performed outside of the avionics but is reliable, in order to be displayed to the pilot and facilitate confirmation of the new path.

With regard to the comparison between alternative route and current route of the aircraft, several embodiments are described hereinafter.

Comparing paths makes it possible to evaluate the operational gains in a reliable and meaningful manner that is not biased by variabilities in the path computation mode.

During the phase of taking into account (or importing or incorporating) the alternative route, the path computed over this new route by the avionic navigation computer may be compared with the path computed in the alternative route computer. This comparison through a reliable function allows the conformity of the route to be ensured before it is confirmed by the operator as new flight reference.

In one embodiment, the verification function that is invoked may be 'qualified', i.e. verify the conformity of the computations with coherent accuracy thresholds for the navigational accuracy required for the mission, and/or be coupled to the interactive display means so as to allow visual comparison of the results.

The present invention may be implemented on the basis of hardware and/or software elements. It may be available as a computer program product on a computer-readable medium. The medium may be electronic, magnetic, optical or electromagnetic.

A description is given of a computer program product, said computer program comprising code instructions for performing one or more of the steps of the method when said program is executed on a computer.

In one embodiment, the method is implemented by computer.

In one embodiment, the system for implementing the invention comprises a computer-readable storage medium (RAM, ROM, flash memory or another memory technology, for example a disk medium or another computer-readable non-transitory storage medium) coded with a computer program (that is to say a plurality of executable instructions) that, when it is executed on a processor or a plurality of processors, performs the functions of the embodiments described above. By way of example of hardware architecture suitable for implementing the invention, a device may include a communication bus to which a central processing unit or microprocessor (CPU) are connected, which processor may be 'multicore' or 'manycore'; a read-only memory (ROM) able to contain the programs necessary for implementing the invention; a random access memory (RAM) or cache memory containing registers suitable for recording variables and parameters that are created and modified during the execution of the aforementioned programs; and an I/O ('input/output') or communication interface suitable for transmitting and for receiving data.

In the case where the invention is implanted in a reprogrammable computing machine (for example an FPGA circuit), the corresponding program (that is to say the sequence of instructions) may be stored in or on a storage medium that is removable (for example an SD card, a mass storage means, such as a hard disk, e.g. an SSD) or that is non-removable, that is volatile or non-volatile, this storage medium being readable in part or in full by a computer or a processor. The computer-readable medium may be transportable or communicable or mobile or transmissible (i.e. via a 2G, 3G, 4G, WiFi, BLE, fibre-optic or other telecommunication network).

The reference to a computer program that, when it is executed, performs any one of the previously described functions is not limited to an application program being executed on a single host computer. On the contrary, the terms computer program and software are used here in a general sense to refer to any type of computer code (for example, application software, firmware, microcode, or any other form of computer instruction, such as web services or SOA or via programming interfaces API) that may be used to program one or more processors so as to implement aspects of the techniques described here. The computing means or resources may notably be distributed ('cloud computing'), possibly with or using peer-to-peer and/or virtualization technologies. The software code may be executed on any suitable processor (for example a microprocessor) or processor core or set of processors, whether these are provided in a single computing device or distributed between several computing devices (for example such as possibly accessible in the environment of the device). Security technologies (crypto-processors, possibly biometric authentication, encryption, chip card, etc.) may be used.

In some embodiments, the various steps of the method may be implemented wholly or partly on the FMS and/or on one or more EFB (electronic flight bags) and/or tablets and/or airline or mission computers.

The invention claimed is:

1. A method for managing a route of an aircraft, implemented in a system comprising an avionic system and a non-avionic system, comprising the steps:

determining an alternative route to a current route in the non-avionic system by executing first software code identical to second software code implemented in a flight management system of the avionic system;

receiving an authorization to insert said route into the flight management system; and inserting said route into the flight management system.

2. The method according to claim 1, wherein the step of determining an alternative route in the non-avionic system comprises executing software code functionally equivalent to software code implemented in the flight management system of the avionic system.

3. The method according to claim 1, wherein the insertion authorization is conditional on a step of comparing the alternative route determined in or by the non-avionic system with the current route determined in or by the avionic system.

4. The method according to claim 1, further comprising evaluating or verifying the determined alternative route according to predefined criteria.

5. The method according to claim 1, comprising the step of receiving data of non-avionic origin in order to determine an alternative route to the current route in the non-avionic system.

6. The method according to claim 1, one or more steps being triggered depending on the flight context.

7. The method according to claim 1, wherein the non-avionic system is operable to satisfy one or more performance criteria, and
wherein the avionic system is not operable to satisfy the one or more performance criteria.

8. The method according to claim 1, further comprising modifying the determined alternative route.

9. The method according to claim 8, wherein the step of modifying the determined alternative route comprises one or more steps of combinatorial optimization and/or of multi-objective optimization, depending on one or more parameters selected from among the parameters comprising the present and predicted weather conditions through which the aircraft is moving, the surrounding air traffic, the structure of the airspace, the airport services of the destination or diversionary airport, the load factor and/or the passenger comfort that is estimated and associated with said route, the fuel cost, the flight time, the punctuality of the flight, the operational flight cost, the availability of the flight crew, the availability of maintenance hardware, environmental criteria, compliance with AOC company rules and ATC regulations, the probability of acceptance of the alternative route in terms of AOC and/or ATC negotiation.

10. The method according to claim 1, wherein the authorization to insert said alternative route is received from a human-machine interface and/or authorized by an avionic system.

11. The method according to claim 10, wherein the human-machine interface displays the determined alternative route and the current route of the aircraft by juxtaposing them.

12. The method according to claim 10, the human-machine interface comprising at least one cursor configured to trigger display of one or more flight parameters associated with the determined alternative route over time depending on movement of said at least one cursor.

13. A non-transitory, computer-readable medium comprising instructions executable by at least one processor for performing the method according to claim 1.

14. A system for managing a route of an aircraft, comprising:
a non-avionic system configured to determine one or more alternative routes to a current route of the aircraft by executing first software code identical to second software code implemented in a flight management system of an avionic system;
a gateway system configured to receive an authorization to insert the one or more alternative routes into the avionic system;
said avionic system comprising the flight management system configured to insert said one or more routes into the flight management system; and
the avionic system being associated with a physical fault rate that is lower and a logic verification that is higher than those of the non-avionic system.

15. The system according to claim 14, further comprising an flight management system (FMS) and/or an air navigation traffic control system and a non-avionic system comprising an electronic flight bag (EFB) or a digital tablet.

* * * * *

UNITED STATES PATENT AND TRADEMARK OFFICE
CERTIFICATE OF CORRECTION

PATENT NO. : 10,699,582 B2
APPLICATION NO. : 16/009017
DATED : June 30, 2020
INVENTOR(S) : Benoît Dacre-Wright et al.

Page 1 of 1

It is certified that error appears in the above-identified patent and that said Letters Patent is hereby corrected as shown below:

In the Claims

In Claim 15, Column 22, Line 34, "comprising an flight" should be -- comprising an avionic flight --.

Signed and Sealed this
Eighth Day of December, 2020

Andrei Iancu
*Director of the United States Patent and Trademark Office*